May 7, 1946.    K. BRENKERT    2,399,721
GENEVA MOVEMENT
Filed Aug. 5, 1944
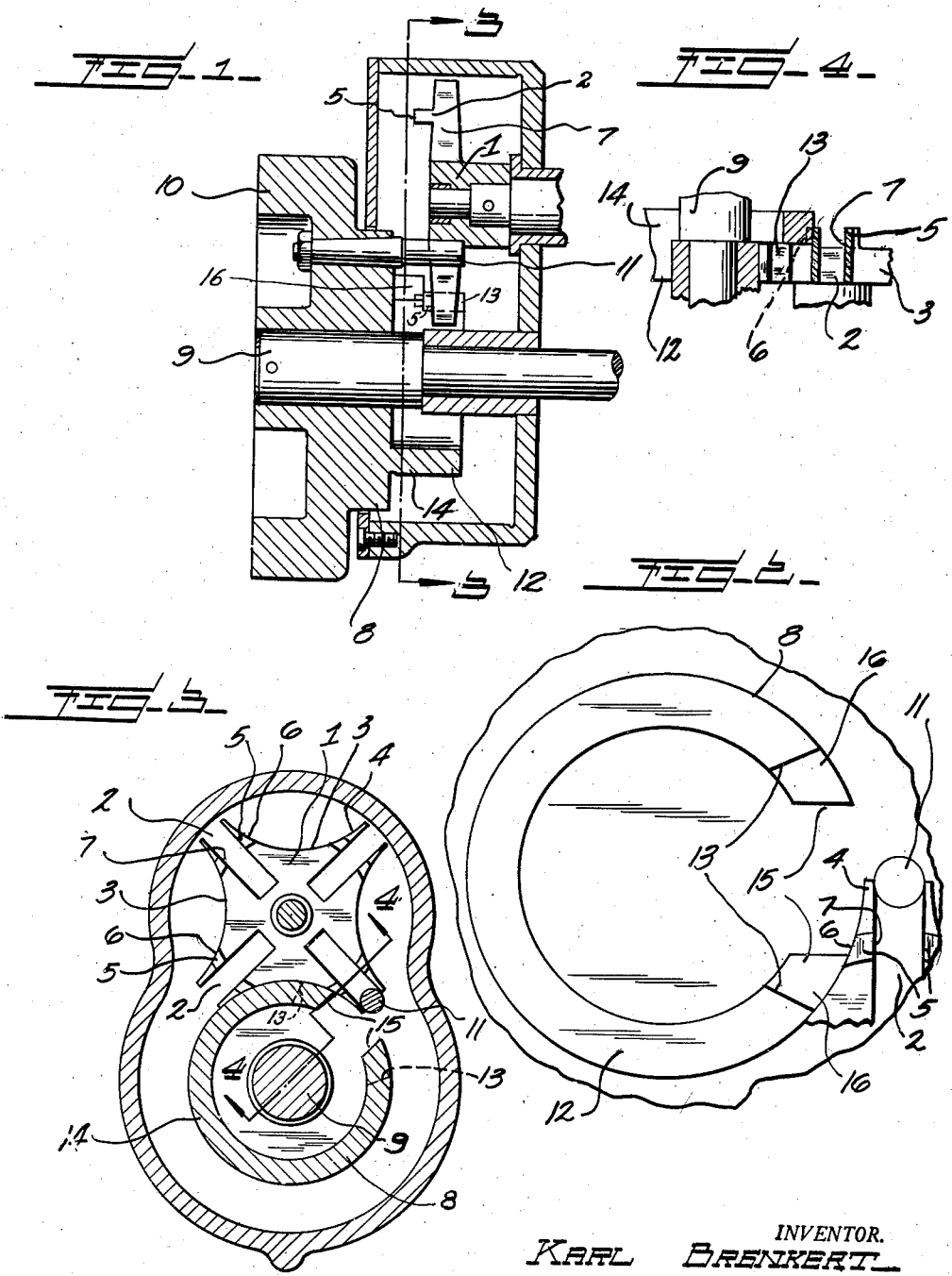
INVENTOR.
KARL BRENKERT
BY
Samuel Weisman Patented May 7, 1946

2,399,721

UNITED STATES PATENT OFFICE 2,399,721

GENEVA MOVEMENT

Karl Brenkert, Detroit, Mich., assignor to Brenkert Light Projection Company, Detroit, Mich., a corporation of Michigan Application August 5, 1944, Serial No. 548,245

7 Claims. (Cl. 74—436)

The present invention pertains to a novel Geneva movement and relates particularly to the locking means for the star wheel.

The lock of a Geneva movement, to prevent rotation of the star wheel between its intermittent movements, consists of an arcuate flange on the cam wheel engaging successively with concave surfaces on the periphery of the star wheel. The arcuate surface has a mathematically determined slot to accommodate the corners of the star wheel during its movement. The slot overlaps a concave surface of the star wheel before the cam pin enters a star wheel slot and after the pin emerges from a star wheel slot. At these times the area of contact between the convex and concave surfaces is reduced and the locking effect is correspondingly diminished. There is free play or backlash in the star wheel, inversely proportional to the accuracy with which the parts are finished. In motion picture apparatus for theatrical use, the accuracy must be within .0001 inch to meet current standards of projection.

The object of the invention is to improve the locking effect for a given manufacturing tolerance in the parts, whereby the required locking effect may be obtained with a greater tolerance in the parts than is now necessary. Obviously, if the tolerance in precision mechanism can be increased, the cost of manufacture can be reduced.

The device that accomplishes this object has a lateral extension or continuation of the arcuate locking flange or surface of the cam wheel. The usual locking surface, i. e., without the extension, has the usual, mathematically determined slot to receive the moving star wheel. The lateral extension is also projected arcuately to overlap the usual slot, preferably at both ends. The star wheel carries laterally extending lugs on one of its faces, each lug having a surface adapted to ride on the convex surface of the aforementioned extension. The lugs are preferably disposed at both sides of the slots in the star wheel. The lugs do not ride on the usual locking surface and thus do not interfere with the movement of the star wheel in the usual slot in the locking surface. They do, however, ride on the arcuate projections of the extension as the cam pin enters a star wheel slot and leaves a star wheel slot, thereby increasing the effective area of locking engagement when this area is ordinarily reduced. The result is a more secure locking engagement at these intervals in the cycle.

The invention is fully disclosed by way of example in the following description and in the accompanying drawing in which Figure 1 is a diametrical section;

Figure 2 is a detail elevation;

Figure 3 is a section on the line 3—3 of Figure 1, the mechanism being advanced 45°, and Figure 4 is a section on the line 4—4 of Figure 3.

Reference to these views will now be made by use of like characters which are employed to designate corresponding parts throughout.

The star wheel 1 of the Geneva movement is formed as usual with four radial slots 2 spaced 90° apart and with concave peripheral edges 3 between the slots. It will be understood that the invention is not limited to four slots, inasmuch as various numbers of slots in a given wheel are known in the prior art and may be employed in conjunction with the improvements disclosed herein.

Each slot forms two fingers 4 with the ends of the faces 3 on both sides of the slot. On each such finger, near its free end, is formed or secured a lug 5, having a curved surface 6 in prolongation of the nearer face 3 and a flat face 7 in prolongation of the nearer wall of the adjacent slot 2. All the lugs are on the same surface of the star wheel.

The cam wheel 8 for driving the star wheel is mounted on a shaft 9 and may be integral with a flywheel 10 which, however, is not a limitation of this invention. The cam wheel overlaps the star wheel at one side and carries a cam pin 11 adapted to enter and leave the slots 2 in succession, thereby producing intermittent rotation of the star wheel in the manner familiar in the art.

Adjacent to a face of the cam wheel 8 is provided a concentric locking flange 12 having an outer radius equal to the radius of the faces 3 and supported in a manner presently to be described. The cam wheel is so journalled that the locking flange rides in surface contact with the faces 3 successively, thereby holding the star wheel substantially against rotation while the cam pin 11 travels from a given slot 2 to the next slot, externally of the star wheel. This action is also known in the art.

The locking flange 12 has an interruption or slot 13 to accommodate the fingers 4 in the intermittent rotation of the star wheel 1. For a star wheel having four slots, the slot 13 has an arcuate extent of about 96°. As a pair of fingers 4 enters the slot 13 or emerges therefrom, or as the cam pin 11 emerges from or enters a slot 4, only a portion of a star wheel face 3 is engaged by the flange 12. Unless the faces 3 and the outer circumference of the flange 12 are finished with extreme accuracy, there will be appreciable looseness or backlash in the star wheel with respect to the cam wheel, and this in inverse relation to the accuracy of the finish.

In the motion picture projector art, for example, there will be excessive free play of the star wheel unless the contacting surfaces are finished within a tolerance of .0001 inch. Such accurate finish is of course expensive. This invention provides a means for holding the free play or backlash of the star wheel to the required minimum without necessitating such a high degree of manufacturing accuracy as heretofore required.

Accordingly, there is provided an extension 14 of the locking flange 12 having the same outside circumference as the flange. In the disclosed construction the extension 14 is located at the base of the flange 12 but, as indicated by the claims, the invention is not limited to this particular location. It is to be noted that the star wheel faces 3 engage only the flange 12 and not the extension 14. The extension has a slot 15 coaxial with the flange slot 13 and of less arcuate extent. For a four-slot star wheel, the slot 15 is about 40° in extent or approximately half of the slot 13. The difference in the arcuate extent of the slots exposes a portion of the extension 14 as a step or projection 16 at each end of the slot 13.

The lugs 5 are of such length axially of the star wheel 1 that the concave sides 6 thereof engage and ride on the projections 16 after the flange 12 has passed a given lug on the slot-entering movement of the cam pin 11 and before the flange has engaged the lug on the emerging movement of the pin. At these points in the cycle, the flange 12 makes its minimum engagement with a star wheel face 3 and permits free play or backlash as above described. The lugs, in engaging the projections 16 at a point spaced arcuately from the engaged end of the flange 12, have the effect of lengthening the arc of contact between the locking flange and the star wheel and thereby stabilizing the latter before entrance of the cam pin into the star wheel slots and after emergence of the pin from the slots. The interval of unstable locking engagement between the star wheel and the cam wheel is reduced by about 50 per cent. Consequently, a given degree of stability of the star wheel while not turning is obtainable with greater manufacturing tolerance in the parts than would otherwise be necessary.

In Figure 3, with the cam wheel turning counterclockwise, there is sufficient play between the star wheel and the cam wheel to permit a slight displacement of the right hand lower lug 5 so that it is not obstructed before clearing the adjacent end of opening 15 and entering the opening.

Although a specific embodiment of the invention has been illustrated and described, it will be understood that various alterations in the details of construction may be made without departing from the scope of the invention as indicated by the appended claims.

What I claim is:

1. A Geneva movement comprising a rotatable star wheel having a plurality of substantially radial slots extending through the periphery thereof and having concave peripheral faces between adjacent slots, a rotatable cam wheel spaced laterally from said star wheel and having a cam pin adapted to enter and emerge from said slots successively, an arcuate locking surface carried by said cam wheel having the same outside radius as said faces and adapted to ride successively on said faces in surface contact therewith, the ends of said surface forming an opening to receive parts of said star wheel during rotation thereof, said surface being provided with an extension at an end of said opening, said extension projecting partially across said opening and having a convex surface in prolongation of the outer circumference of said locking surface, and lugs projecting from a surface of said star wheel and engageable by said convex surface.

2. A Geneva movement comprising a rotatable star wheel having a plurality of substantially radial slots extending through the periphery thereof and having concave peripheral faces between adjacent slots, a rotatable cam wheel spaced laterally from said star wheel and having a cam pin adapted to enter and emerge from said slots successively, an arcuate locking surface carried by said cam wheel having the same outside radius as said faces and adapted to ride successively on said faces in surface contact therewith, the ends of said surface forming an opening to receive parts of said star wheel during rotation thereof, said surface being provided with an extension at each end of said opening, said extensions projecting partially across said opening and each having a convex surface in prolongation of the outer circumference of said surface, and lugs projecting from a surface of said star wheel and engageable by said convex surfaces.

3. A Geneva movement comprising a rotatable star wheel having a plurality of substantially radial slots extending through the periphery thereof and having concave peripheral faces between adjacent slots, a rotatable cam wheel spaced laterally from said star wheel and having a cam pin adapted to enter and emerge from said slots successively, an arcuate locking surface carried by said cam wheel having the same outside radius as said faces and adapted to ride successively on said faces in surface contact therewith, the ends of said surface forming an opening to receive parts of said star wheel during rotation thereof, said surface being provided with an extension at each end of said opening, said extensions projecting partially across said opening and each having a convex surface in prolongation of the outer circumference of said surface, said extensions being spaced apart at said opening substantially half the arcuate extent of said opening, and lugs projecting from a surface of said star wheel and engageable by said convex surfaces.

4. A Geneva movement comprising a rotatable star wheel having a plurality of substantially radial slots extending through the periphery thereof and having concave peripheral slots, a rotatable cam wheel spaced laterally from said star wheel and having a cam pin adapted to enter and emerge from said slots successively, an arcuate locking surface carried by said cam wheel having the same outside radius as said faces and adapted to ride successively on said faces in surface contact therewith, the ends of said surface forming an opening to receive parts of said star wheel during rotation thereof, said surface being provided with an extension at each end of said opening, said extensions projecting partially across said opening and each having a convex surface in prolongation of the outer circumference of said surface, said extensions being spaced symmetrically with respect to the center of said opening and spaced apart at said opening substantially half the arcuate extent of said opening, and lugs projecting from a surface of said star wheel and engageable by said convex surfaces.

5. A Geneva movement comprising a rotatable star wheel having a plurality of substantially radial slots extending through the periphery thereof and having concave peripheral faces between adjacent slots, a rotatable cam wheel spaced laterally from said star wheel and having a cam pin adapted to enter and emerge from said slots successively, an arcuate locking surface carried by said cam wheel having the same outside radius as said faces and adapted to ride successively on said faces in surface contact therewith, the ends of said surface forming an opening to receive parts of said star wheel during rotation thereof, said surface being provided with an extension at each end of said opening, said extensions projecting partially across said opening and each having a convex surface in prolongation of the outer circumference of said surface, and lugs projecting from a surface of said star wheel at opposite sides of each slot and engageable by said convex surfaces.

6. A Geneva movement comprising a rotatable star wheel having a plurality of substantially radial slots extending through the periphery thereof and having concave peripheral faces between adjacent slots, a rotatable cam wheel spaced laterally from said star wheel and having a cam pin adapted to enter and emerge from said slots successively, an arcuate locking surface on said cam wheel having the same outside radius as said faces and adapted to ride successively on said faces in surface contact therewith, the ends of said surface forming an opening to receive parts of said star wheel during rotation thereof, an extension from said surface at each end of said opening, said extension projecting partially across said opening and each having a convex surface concentric with the outer circumference of said locking surface, and lugs projecting from a surface of said star wheel and engageable by said convex surfaces.

7. A Geneva movement comprising a rotatable star wheel having a plurality of substantially radial slots extending through the periphery thereof and having concave peripheral faces between adjacent slots, a rotatable cam wheel spaced laterally from said star wheel and having a cam pin adapted to enter and emerge from said slots successively, an arcuate locking surface on said cam wheel having the same outside radius as said faces and adapted to ride successively on said faces in surface contact therewith, the ends of said surface forming an opening to receive parts of said star wheel during rotation thereof, an extension from said surface at an end of said opening, said extension projecting partially across said opening and having a convex surface in prolongation of the outer circumference of said locking surface, and lugs projecting from a surface of said star wheel and engageable by said convex surface.

KARL BRENKERT.